US011985998B2

(12) United States Patent
Van Den Brenk et al.

(10) Patent No.: US 11,985,998 B2
(45) Date of Patent: May 21, 2024

(54) PROCESS FOR PREPARING INFANT FORMULA USING A STATIC MIXER

(71) Applicant: N. V. NUTRICIA, Zoetermeer (NL)

(72) Inventors: Joep Van Den Brenk, Den Bosch (NL); Koen Cornelis Van Dijke, Leusden (NL); Raoul Charles Johan Moonen, Amersfoort (NL)

(73) Assignee: N. V. NUTRICIA, Zoetermeer (NL)

( * ) Notice: Subject to any disclaimer, the term of this patent is extended or adjusted under 35 U.S.C. 154(b) by 798 days.

(21) Appl. No.: 14/917,988

(22) PCT Filed: Sep. 11, 2014

(86) PCT No.: PCT/EP2014/069359
§ 371 (c)(1),
(2) Date: Mar. 10, 2016

(87) PCT Pub. No.: WO2015/036466
PCT Pub. Date: Mar. 19, 2015

(65) Prior Publication Data
US 2016/0278413 A1    Sep. 29, 2016

(30) Foreign Application Priority Data

Sep. 13, 2013  (WO) ............... PCT/EP2013/069070

(51) Int. Cl.
*A23L 33/10*        (2016.01)
*A23D 7/005*        (2006.01)
(Continued)

(52) U.S. Cl.
CPC ............ *A23L 33/10* (2016.08); *A23D 7/0053* (2013.01); *A23D 9/05* (2013.01); *A23L 33/115* (2016.08);
(Continued)

(58) Field of Classification Search
CPC ..................................................... A23L 33/10
See application file for complete search history.

(56) References Cited

U.S. PATENT DOCUMENTS

| 2002/0039596 | A1* | 4/2002 | Hartounian | .......... A61K 9/1277 424/450 |
| 2008/0113067 | A1  | 5/2008 | Sarma et al. | |

(Continued)

FOREIGN PATENT DOCUMENTS

| EP | 2638810 A1 | 9/2013 |
| EP | 2638811 A1 | 9/2013 |

(Continued)

OTHER PUBLICATIONS

International Search Report and Written Opinion of the ISA for PCT/EP2014/069359, ISA/EP, Rijswijk, NL, dated Dec. 18, 2014.
(Continued)

*Primary Examiner* — Amber R Orlando
*Assistant Examiner* — Philip A Dubois
(74) *Attorney, Agent, or Firm* — Harness, Dickey & Pierce, P.L.C.; Stephen T. Olson (57) ABSTRACT

The present invention relates to a process for preparing a lipid and protein component-containing composition comprising large lipid globules, preferably coated with polar lipids, and to the compositions obtained thereby. Optionally, the lipid and protein component-containing composition is spray-dried. The obtained compositions are for feeding infants and young children.

19 Claims, 3 Drawing Sheets

(51) Int. Cl.
| | |
|---|---|
| *A23D 9/05* | (2006.01) |
| *A23L 33/00* | (2016.01) |
| *A23L 33/115* | (2016.01) |
| *A23L 33/15* | (2016.01) |
| *A23L 33/16* | (2016.01) |
| *A23L 33/19* | (2016.01) |
| *A23L 33/21* | (2016.01) |
| *A23L 35/00* | (2016.01) |

(52) U.S. Cl.
CPC ............... *A23L 33/15* (2016.08); *A23L 33/16* (2016.08); *A23L 33/19* (2016.08); *A23L 33/21* (2016.08); *A23L 33/40* (2016.08); *A23L 35/10* (2016.08); *A23V 2002/00* (2013.01)

(56) References Cited

U.S. PATENT DOCUMENTS

| | | |
|---|---|---|
| 2008/0311211 A1 | 12/2008 | Leser et al. |
| 2010/0034940 A1 | 2/2010 | Sarma et al. |
| 2011/0206743 A1 | 8/2011 | Van Baalen et al. |
| 2011/0217411 A1 | 9/2011 | Van Der Beek et al. |
| 2011/0300204 A1 | 12/2011 | Van Der Beek et al. |
| 2011/0300225 A1 | 12/2011 | Van Der Beek et al. |
| 2012/0177708 A1 | 7/2012 | Leser et al. |
| 2014/0093554 A1 | 4/2014 | Van Der Beek et al. |

FOREIGN PATENT DOCUMENTS

| | | |
|---|---|---|
| EP | 2825062 B1 | 5/2017 |
| WO | WO-2010/027258 A2 | 1/2002 |
| WO | WO-2007/060171 A1 | 5/2007 |
| WO | 2010027258 A1 | 3/2010 |
| WO | WO-2010/068086 A1 | 6/2010 |
| WO | WO-2013/067603 A1 | 5/2013 |

OTHER PUBLICATIONS

International Preliminary Report on Patentability for PCT/EP2014/069359, IPEA/EP, Munich, dated Jan. 8, 2016.
Notice of Opposition received for the European Patent Application No. 14761874.8, mailed on Sep. 1, 2020, 6 pages.
Costing et al., Size and Phospholipid Coating of Lipid Droplets in The Diet of Young Mice Modify Body Fat Accumulation in Adulthood, Pediatric Research, vol. 72, No. 4, Oct. 2012, pp. 362-369.
Static Mixing, Reaction, Heat Transfer & Fluid Dynamics Technology, Stamixco, Brochure on Static Mixers, 2007, 8 pages.
Thakur et al., Static Mixers in The Process Industries—A Review, Trans IChemE, vol. 81, Part A, Aug. 2003, pp. 787-826.
Harnby et al., Mixing in the Process Industries, Second edition, 1992, pp. 126-127.
Paul et al., Handbook of Industrial Mixing, Science and Practice, 2004, pp. 400 and 646.
Couvrer et al., Composition of Milk Fat from Cows Selected for Milk Fat Globule Size and Offered Either Fresh Pasture or a Corn Silage-Based Diet, Journal of Dairy Science. vol. 90, 2007, pp. 392-403.
Data Sheet for T 50 Ultra-Turrax Disperser, 2012, 1 page.
Mujumdar, Handbook of Industrial Drying, Third edition, Chapter 10.2.2.2 to 10.2.2.5, 2006, 7 pages.
Murphy et al., A High-Solids Steam Injection Process for The Manufacture of Powdered Infant Milk Formula, Dairy Science & Technolgy, vol. 93, 2013, pp. 463-475.

* cited by examiner

PROCESS FOR PREPARING INFANT FORMULA USING A STATIC MIXER

CROSS-REFERENCE TO RELATED APPLICATIONS

This application is a 371 U.S. National Stage of International Application No. PCT/EP2014/069359, filed Sep. 11, 2014, which claims the benefit of and priority to International Application No. PCT/EP2013/069070, filed Sep. 13, 2013. The disclosures of the above applications are incorporated herein by reference.

The present invention relates to a process for preparing a lipid and protein component-containing composition comprising large lipid globules, preferably coated with polar lipids, and to the compositions obtained thereby. Optionally, the lipid and protein component-containing composition is spray-dried. The obtained compositions are for feeding infants and young children.

Infant or follow-on formulae are used successfully for feeding infants in cases where breast-feeding is impossible or less desirable. Still, the composition of such formulations should resemble breast milk as closely as possible, which is the preferred method of feeding infants to accommodate the special nutritional requirements of the fast growing and developing infant.

In natural unprocessed mammalian milk, lipids occur primarily as triglycerides contained within emulsified globules with a mean diameter of approximately 4 µm. These globules are surrounded by a structural membrane composed of phospholipids (0.2 to 1 wt. % based on total fat), glycolipids, cholesterol, enzymes, proteins, and glycoproteins. The major part of the fat component used in infant or follow-on formulae is of vegetable origin. The use of a large part of cow's milk fat is less desirable, because of a more unfavourable fatty acid profile. Additionally, long-chain polyunsaturated fatty acids of microbial, fish or egg origin are typically added to improve the fatty acid profile.

In known processes for preparing infant or follow-on formulae the fat or lipid phase comprising lipids and lipid-soluble vitamins is mixed vigorously with the aqueous phase comprising proteins and carbohydrates and the mixture is homogenised under high pressure by a conventional high pressure homogeniser alone or in combination with a high pressure pump. Thus, during homogenisation the fat phase is compartmentalized into smaller droplets so that it no longer separates from the aqueous phase and collects at the top, which is called creaming. This is accomplished by forcing the mixture at high pressure through a small orifice. This homogenisation step results in a stable oil-in-water emulsion, comprising lipid globules with a mode volume-weighted diameter of 0.1 to 0.5 µm. Due to this small globule size, which results in an increased lipid globule surface area, the relatively small amount of polar lipids, such as phospholipids, typically present in such compositions wherein the fat is mainly of vegetable origin is not sufficient to ensure that the distribution of the phospholipids corresponds to unprocessed lipid globules. Instead, the amount of protein, in particular casein, covering the lipid globules increases.

This is in contrast with the structure of lipid globules in unprocessed or raw milk, such as human milk, wherein the lipid globules are larger and the lipid globules are covered with a milk globule membrane comprising polar lipids in higher quantities than the above described processed IMF (infant milk formula). The preparation of larger lipid globules is thus desirable in order to prepare infant or follow-on formulae which more closely resemble human milk. Nutritional compositions with vegetable fat having larger lipid globules were also recently found to have long term health benefits with regard to body composition and prevention of obesity later in life. WO 2010/027258 discloses nutritional compositions with vegetable fat having larger lipid globules which are produced by applying a homogenisation step using lower pressure. WO 2010/027259 discloses nutritional compositions with larger lipid globules coated with polar lipids using a homogenisation step with a lower pressure and a higher amount of polar lipids, in particular phospholipids, present before homogenisation.

WO 2010/027258, WO 2010/027259, WO 2011/108918 and WO 2010/068105 disclose the preparation of nutritional compositions comprising a process step of mixing an aqueous phase with an oil blend using an Ultra-Turrax T50 batch mixer. In the mixing chamber of a batch mixer heterogenous mixing conditions are present, resulting in a broad lipid droplet size distribution and the formation of partially very large lipid globules. Furthermore, the liquid phases to be mixed are subjected in a batch mixer for an extended time to changing mixing conditions thereby reinforcing the upper identified effects of producing a broad droplet size distribution and forming extremely small and extremely large lipid globules. Due to inhomogeneous mixing a batch mixer disadvantageously has a higher risk of large and small fat globules.

WO 2005/051091 relates to a lipid preparation which mimics the lipid phase of human milk. The lipid preparation is produced by a homogenisation step to form a substantially homogeneous dispersion or emulsion under suitable conditions which include temperature, pressure and physical manipulation.

Borel et al. (J of Parenteral and Enteral Nutrition (1994), 18, 534-543) discloses the preparation of tube-feeding emulsions with different droplet sizes and compositions for feeding rats, wherein an emulsion from a lipid and an aqueous phase is prepared by magnetically stirring the mixture with a magnetic bar and further refining the prepared emulsion by sonification. Such a process is not suitable for a larger scale and will give too large variation in the globule size.

Thus, most of these known processes employ high pressure mixing devices, in particular homogenisers and/or high pressure pumps. In the processes employing homogenisers mostly two pressure steps are needed resulting in a capital intensive production process. Further, if low pressures are used with these homogenisers which are especially designed to use high pressures to allow for homogenisation, the operation process is hard to control in a stable way, that means the process needs a high amount of additional control which is laborious, time consuming and can result in varying end product qualities. Thus, the commercially used machinery is overdimensioned and has a low energy efficiency. This renders these processes less preferred for an economical production.

The technical problem underlying the present invention is therefore to provide a process for the preparation of a lipid and protein component-containing composition comprising large lipid globules, preferably coated with polar lipids, which allows to produce said composition without the above mentioned disadvantages.

The technical problem underlying the present invention is therefore also to provide lipid and protein component-containing compositions which overcome the above-identified disadvantages, in particular comprise a controllable, reproducible, lipid globule size.

These technical problems are solved by the processes and the pro-ducts according to the independent claims.

Thus, the present invention provides in particular a process for preparing a lipid and protein component-containing composition, which is an infant formula or a follow-on formula or a growing up milk and comprises lipid globules, comprising the steps of a) providing an aqueous phase with a dry matter content of 10 to 60 wt. % (based on total weight of the aqueous phase), which comprises at least one protein component, b) providing a liquid lipid phase, which comprises at least one lipid and c) mixing the lipid phase with the aqueous phase in a ratio of 5 to 50% (w/w) using a static mixer so as to obtain a lipid and protein component-containing composition comprising lipid globules.

Preferably, the static mixer exerts a low shear force. Surprisingly, it was found that by using a static mixer such a composition could be produced with much better control and reproducibility of lipid droplet size. In a preferred embodiment, a narrower size distribution can be obtained. Advantageously, the size of the obtained lipid globules is such that the volume-weighted mode diameter is less than 20 µm, preferably less than 15 µm, preferably 2 to 12 µm, preferably 4 to 8 µm. Furthermore, the obtained lipid globules have a volume-weighted mode diameter of at least 1 µm, and/or are lipid globules, wherein at least 60%, preferably at least 65%, preferably at least 70%, of said lipid globules have a diameter from 2 to 12 µm, preferably 3 to 11 µm, preferably 3 to 5 µm, (% based on vol.–%). Furthermore, the obtained lipid globules have a volume-weighted mode diameter of at least 1 µm, preferably of at least 2 µm, more preferably of at least 3 µm, most preferred of at least 3.5 µm, even more preferred of around 4 µm. Most preferred at least 60%, preferably at least 65%, preferably at least 70%, more preferably at least 75% (based on volume) of the lipid globules have a volume-weighted diameter between 2 to 12 µm. The use of a static mixer is also cost efficient, in particular with regard to the energy costs, in particular when compared to a conventional homogenizer or an in-line mixer. The use of a static mixer is further advantageous insofar, as viscous mixtures, such as mixtures with a high total solid (TS) content can be efficiently mixed. The process additionally has the advantages that an overdimensioned machinery is not necessary and energy is used more efficiently. Without wishing to be bound by theory, the present advantages obtained may be due to the lower shear forces experienced by the lipid droplets or globules of the composition during the production process compared to standard homogenization processes. Static mixers typically exert low shear forces. Typically, employing a static mixer, even when used with a high flow through rate, exerts lower shear forces than conventional homogenization.

In particular and preferably, lower shear forces are applied during the course of the present production process starting from the mixing of the aqueous and lipid phases using a static mixer. The present process is characterised by a very good controllability and reproducibility. Preferably, high shear forces are already avoided from the point the lipid phase is fed into the aqueous phase, which might occur before or during mixing. The present teaching, in particular the present process, results in the production of lipid globules having a volume-weighted mode diameter more close to the diameter of natural human milk lipid globules, which can be coated by a membrane of polar lipids, if desired, leading to a further resemblance of natural milk lipid globules. The composition obtainable, preferably obtained by the process according to the present invention, thus does more resemble human milk with respect to the lipid globule size and architecture. Therefore, by using the process according to the present invention employing a static mixer an emulsion, preferably a stable oil-in-water emulsion of large lipid globules, with improved properties is provided without the need of a (two-step) homogenisation allowing both a more economical and more convenient production as well as the provision of improved nutritional compositions. Thus, the present process preferably and advantageously does not involve high pressure and/or high energy input homogenisation devices, in particular does not use sonification or a (two-step) homogeniser, but instead uses a static mixer. This is advantageous in so far as homogenisers typically used for such processes exert high shear forces such as resulting from pressures of 50 to 150 bars in conventional homogenizers, whereas a static mixer, such as used in the present process only applies low shear forces.

Dynamic high pressure is conventionally used in the food industry and is sometimes also referred to as high pressure valve homogenization.

In a preferred embodiment of the present invention, the present process does not use a dynamic high pressure homogeniser or a dynamic high pressure homogenisation step.

In a preferred embodiment of the present invention, the present process does not use a dynamic high pressure one-step homogeniser or a dynamic high pressure one-step homogenisation process. In a preferred embodiment of the present invention, the present process does not use a dynamic high pressure two-step homogeniser or a dynamic high pressure two-step homogenisation process.

In the context of present invention, the term "the present process", preferably encompasses a process with process steps a), b), c) and, if applied, an optional premixing step subsequent to process steps a) and b) and before conducting process step c), and, if applied, an optional spray-drying step.

Preferably, the present process consists of process steps a), b) and c). Most preferably, the present process consists of step a), step b), premixing the liquid lipid phase with the aqueous phase and step c). Preferably, the present process consists of step a), step b), premixing the liquid lipid phase with the aqueous phase, step c) and a spray-drying step.

The process according to the present invention requires in step a) the provision of an aqueous phase with a dry matter content of 10 to 60 wt. %, preferably 15 to 55 wt. %, more preferably 20 to 50 wt. %, even more preferred 25 to 50 wt. %, preferably 25 to 45 wt. %, most preferred 30 to 50 wt % (each based on total weight of the aqueous phase), comprising at least one protein component.

It is furthermore preferred to provide the aqueous phase with a dry matter content of 30 to 60 wt. % preferably 35 to 50 wt. %, more preferably 40 to 50 wt. %.

In the context of the present invention the term "protein component" refers to proteinaceous matter in general, which includes proteins, peptides, free amino acids but also compositions comprising proteins, peptides and/or free amino acids, i. e. are sources of protein.

The source of the protein, that means the protein component, is preferably selected in such a way that the minimum requirements of an infant for essential amino acid content are met and satisfactory growth is ensured. Hence, protein components based on cow's milk proteins such as whey protein, casein and mixtures thereof and proteins based on soy, potato or pea are preferred. In case whey proteins are used, the protein component is preferably based on acid whey or sweet whey, whey protein isolate or mixtures thereof and may include α-lactalbumin and β-lactoglobulin.

In a preferred embodiment the aqueous phase also contains at least one further component selected from the group consisting of digestible carbohydrates, non-digestible carbohydrates, vitamins, in particular water-soluble vitamins, trace elements and minerals, preferably according to international directives for infant formulae.

To prepare the aqueous phase, hereinafter also called "compounding of the aqueous phase", the at least one protein component and the above described optional further components are compounded in the aqueous phase, in particular an aqueous medium, preferably water. For this the at least one protein component as well as all other optional components may be in a dry state or present as solutions or suspensions.

Thus, said aqueous phase may be prepared for said provision step by compounding the at least one protein component and optional further components in an aqueous phase, preferably water, in the desired dry matter content. In case an aqueous phase comprising at least one protein component and optional further components is available having a lower dry matter content below 40 wt. %, such as 25.%, it may in a preferred embodiment be foreseen to concentrate, preferably evaporate, said aqueous phase, preferably by using an evaporator, prior to step a) of the present process to yield the required dry matter content.

In a preferred embodiment, this evaporation step is conducted after an optional high heat treatment (HHT). The preferred evaporation step can be performed on the aqueous phase or, in an alternative embodiment, on the mixture of the aqueous and lipid phase, preferably after homogenisation.

Preferably, after compounding all required components in the aqueous phase the pH of the aqueous phase is adjusted to 6.0 to 8.0, more preferably to 6.5 to 7.5.

Optionally, the aqueous phase is filtered by appropriate means to prevent an entering of foreign bodies, for instance impurities or pathogens, into the process.

Optionally, the aqueous phase is pasteurised or heat treated first by a preheating step, wherein the aqueous phase is heated to 60 to 100° C., preferably to 70 to 90° C., more preferably to 85° C. with a holding time of 1 second to 6 minutes, more preferably 10 seconds to 6 minutes, even more preferably 30 seconds to 6 minutes. This leads to a pre-sterilisation of the aqueous phase.

In a preferred embodiment, preferably after heating, the aqueous phase preferably undergoes a high heat treatment (HHT), wherein it is heated to temperatures over 100° C., preferably 120 to 130° C., most preferred to 124° C. This temperature is preferably held for 1 to 4 seconds, more preferably for 2 seconds.

Alternatively, other suitable methods of pasteurisation or sterilisation can be applied. Several pasteurization and sterilisation methods are known in the art and are commercially feasible.

Preferably, the HHT is performed prior to an optionally performed concentration step, preferably evaporisation step.

In a preferred embodiment of the present invention the HHT is performed on the aqueous phase alone. Accordingly, the lipid phase is added thereafter resulting in the mixing and homogenisation of the aqueous and lipid phase. In another embodiment of the present invention the HHT is performed on the mixture of the aqueous and lipid phase. This embodiment allows to customize the obtained oil blend.

During compounding of the aqueous phase the employed shear forces are not critical. Thus, the aqueous phase may be compounded using high shear forces.

In step b) of the process according to the present invention it is preferred to provide a liquid lipid phase, which comprises at least one lipid, preferably at least one vegetable lipid. The presence of vegetable lipids advantageously enables an optimal fatty acid profile, high in (poly)unsaturated fatty acids and/or more reminiscent to human milk fat. Using lipids from cow's milk alone, or other domestic mammals, provides not in any case an optimal fatty acid profile. In particular, such a less optimal fatty acid profile, such as a large amount of saturated fatty acids, is known to result in increased obesity.

Preferably part of the fat, that means lipid, is milk fat, more preferably anhydrous milk fat and/or butter oil. Commercially available lipids, preferably vegetable lipids, for use in the present invention preferably are in the form of a continuous oil phase. The composition obtained by the present process preferably comprises 2.1 to 6.5 g lipids per 100 ml, more preferably 3.0 to 4.0 g per 100 ml, when in liquid form, for instance as a ready-to-feed liquid or, if spray-dried, reconstituted with water.

Based on dry weight, the composition obtained by the present process preferably comprises 10 to 50 wt. %, more preferably 12.5 to 45 wt. %, preferably 12.5 to 40 wt. %, even more preferably 19 to 30 wt. % lipids.

Preferably, the lipid phase comprises 30 to 100 wt. % vegetable lipids based on total lipids, more preferably 50 to 100 wt. %. Preferably, the lipid phase comprises at least 75 wt. %, more preferably at least 85 wt. % triglycerides based on total lipids.

Preferably, the lipid phase comprises further components such as fat-soluble vitamins, preferably according to international directives for infant formulae.

According to the present invention it is preferred that the lipid phase is liquid at the temperature(s) used during the process. However, if the lipid phase is solid due to its composition it is preferably heated to above the melting temperature of the at least one lipid, preferably vegetable lipid, contained in the lipid phase. In a particularly preferred embodiment of the present invention the lipid phase is heated to a temperature above its melting point, preferably to a temperature of 40 to 80° C., preferably 50 to 70° C., more preferably to 55 to 60° C. thereby resulting in a liquid lipid phase. Most preferably, the lipid phase is heated to a temperature of at least 40° C., preferably at least 45° C., more preferably at least 50° C., most preferred to at least 55° C.

If required, the lipid phase is preferably filtered by appropriate filtration devices prior to the next step, preferably step c), to prevent foreign bodies, for instance impurities or pathogens, from entering the production process.

The lipid or fat globules of natural human milk comprise a globule membrane which comprises polar lipids, in particular phospholipids. Thus, it is desirable to provide an infant formula comprising lipid globules comprising a membrane or coating of polar lipids, in particular phospholipids. Thus, in a particularly preferred embodiment of the present process the aqueous phase, the lipid phase or the aqueous and the lipid phase comprise polar lipids, preferably phospholipids, in particular comprise added polar lipids, preferably phospholipids. If the polar lipids, in particular phospholipids are relatively pure, preferably do not contain significant quantities of other components, preferably are pure, such as soy lecithin, they are preferably added to the lipid phase. In case the polar lipids, in particular phospholipids are impure, preferably relatively impure and therefore contain significant quantities of other components which are not dissolvable in the fat or lipid phase, such as when they are present in butter milk serum powder, they are preferably added to the aqueous phase. Most preferred, the polar lipids, in particular phospholipids are comprised in the aqueous phase.

In a preferred embodiment of the present invention, the polar lipids are already contained in the lipid phase to be used according to the present invention.

In a furthermore preferred embodiment the polar lipids are added into the aqueous or the lipid phase or both provided in steps a) or b) of the present process. In a furthermore preferred embodiment the polar lipids may also be added during process step c) during mixture of the lipid and the aqueous phase.

If polar lipids are present in either the aqueous phase, which is preferred, or the lipid phase or in both, the lipid globules preferably become coated with the polar lipids.

By "coated" or "coating" is meant that the outer surface layer of the lipid globule comprises polar lipids, whereas these polar lipids are virtually absent from the core of the lipid globule. The presence of polar lipids as a coating or outer layer of the lipid globule resembles the structure of lipid globules of human milk.

Polar lipids preferably also comprise phospholipids. Preferably, the compositions comprise 0.5 to 20 wt. % phospholipids based on total lipid, more preferably 0.5 to 10 wt. %, more preferably 1 to 10 wt. %, even more preferably 2 to 10 wt. % even more preferably 3 to 8 wt. % phospholipids based on total lipid.

Preferred sources for providing the phospholipids are egg lipids, milk fat, buttermilk fat and butter serum fat, such as beta serum fat. A preferred source for phospholipids, particularly PC (phosphatidylcholine), is soy lecithin and/or sunflower lecithin. The compositions preferably comprise phospholipids derived from milk. Preferably, the compositions comprise phospholipids and glycosphingolipids derived from milk.

Preferably, the polar lipids are located on the surface of the lipid globules, that means as a coating or outer layer after the mixing step c) of the present process. This advantageously also leads to more stable lipid globules. A suitable way to determine whether the polar lipids are located on the surface of the lipid globules is laser scanning microscopy.

The concomitant use of polar lipids derived from domestic animals milk and triglycerides derived from vegetable lipids therefore enables to manufacture coated lipid globules with a coating more similar to human milk, while at the same time providing an optimal fatty acid profile. Suitable commercially available sources for milk polar lipids are BAEF, SM2, SM3 and SM4 powder of Corman, Salibra of Glanbia, and LacProdan MFGM-IO or PL20 from Arla. Preferably at least 25 wt. %, more preferably at least 40 wt. %, most preferably at least 75 wt. % of the polar lipids is derived from milk polar lipids.

The lipid globules produced by the present process preferably comprise a core and preferably a coating, wherein the core comprises a lipid, preferably vegetable lipid. Preferably, the core comprises at least 90 wt. % triglycerides, more preferably consists of triglycerides. The coating preferably comprises polar lipids, in particular phospholipids, wherein not all polar lipids that are contained in the composition need to be comprised in the coating. Preferably, at least 50 wt. %, more preferably at least 70 wt. %, even more preferably at least 85 wt. %, most preferred more than 95 wt. % of the polar lipids, in particular phospholipids present in the composition are comprised in the coating of the lipid globules. Also, not all lipids, preferably vegetable lipids, present in the composition necessarily need to be comprised in the core of the lipid globules. Preferably, at least 50 wt. %, more preferably at least 70 wt. %, even more preferably at least 85 wt. %, even more preferably at least 95 wt. %, most preferred more than 98 wt. % of the lipids, preferably vegetable lipids, comprised in the composition are comprised in the core of the lipid globules.

In a preferred embodiment of the present invention it is required that the liquid lipid phase provided in step b) is premixed with the aqueous phase provided in step a) prior to the mixing step c). Such a premixing step aims to provide a pre-emulsion. The premixing step is preferably carried out under low shear force as defined herein. Preferably, such a premixing step is carried out in a premixer, for instance a batch mixer, in particular a propeller mixer. In a further preferred embodiment, premixing takes place during injection of the lipid phase into the aqueous phase without using a premixer. Preferably, this is realised using a dosing pump. In particular, the dosing pump injects or feeds the lipid phase into the aqueous phase in such a way that a turbulence is created in the aqueous phase, which leads to premixing of the two phases resulting in a coarse emulsion. Preferably, the dosing pump applies low pressure, in particular the pressure is lower than the pressure drop applied by the static mixer.

Advantageously, premixing ensures that both, the aqueous phase and the liquid lipid phase, are fed in the right quantities to the static mixer. Since the resulting lipid droplets are still too large, no stable emulsion is formed during premixing.

In a preferred embodiment, the aqueous phase, the liquid lipid phase or most preferably both phases are prior to the premixing step heated to a temperature from 40° C. to 90° C., preferably 50° C. to 80° C., preferably of 70° C.

In a preferred embodiment of the present invention the liquid lipid phase is fed into the aqueous phase with low pressure, preferably at most 10 bar, more preferably at most 8 bar.

The present invention in an advantageous manner requires to use a static mixer in process step c), preferably which exerts a low shear force. In a particularly preferred embodiment it is, however, in addition required to use the same shear forces, preferably low shear forces, also in process steps relating to the provided liquid lipid phase of step b), namely to process said provided liquid lipid phase under low shear forces, in particular to feed the liquid lipid phase provided in step b) under low shear force into the aqueous phase prior to or during mixing. In consequence thereof, the liquid lipid phase provided in step b) is during its processing in the present process preferably never subjected to higher shear forces.

Step c) of the process according to the present invention requires the mixing of the lipid phase with the aqueous phase. Preferably, mixing is conducted at a ratio of 5 to 50% (w/w) preferably 10 to 40% (w/w), more preferably 15 to 30% (w/w) lipid to aqueous phase.

In case prior to step c) a premixing step is applied mixing is conducted at a ratio of 5 to 50% (w/w), preferably 10 to 40% (w/w), more preferably 15 to 30% (w/w) lipid to aqueous phase.

In the context of the present invention, a ratio of e. g. 5 to 50% refers to a ratio from 5 parts lipid : 95 parts aqueous phase to 50 parts lipid : 50 parts aqueous phase.

The temperature during mixing, i. e. step c) of the present process, preferably is from 40° C. to 90° C., preferably from 50° C. to 80° C., most preferred 70° C.

In the context of the present invention, the term "static mixer" refers to a device for mixing, in particular continuously, at least two fluid materials, in particular an aqueous phase and a liquid lipid phase, in particular refers to a mixer, which comprises a housing, an inlet, an outlet and at least one non-moving mixer element, wherein the housing is configured and formed in a way to force substantially all, preferably all, of the fluid to be mixed along the at least one non-moving mixer element. The housing and the at least one mixer element are designed so as to allow the fluid stream moving through the mixer to be blended by the non-moving mixer elements.

Thus, the present invention preferably requires to use a static mixer which is configured and operated so as to achieve the desired particle size distribution, in particular so as to achieve a pressure drop during the mixing step c) of 0.5 to 30 bar, preferably 1 to 15 bar, preferably 2 to 12 bar, preferably 2 to 10 bar, preferably 2 to 5 bar, preferably 3 to 5 bar. Said pressure drop is measured as the difference of the pressure determined at the inlet of the static mixer housing and the outlet of the static mixer housing. A skilled person can easily determine the configuration and set up of a static mixer, e. g. length and diameter of the mixing elements, to achieve the desired pressure drop.

In the context of the present invention, the configuration of said static mixer is preferably determined by the size and shape of the housing and the size and shape of the at least one mixer element contained therein. In the context of the present invention, the operating conditions used with the present static mixer are preferably the pressure applied at the inlet of the static mixer, the flow rate and the speed of the composition flowing through the static mixer.

In a preferred embodiment, the static mixer is operated with a flow rate of 1.5 to 8l/min, preferably 2 to 7l/min, preferably 2 to 6l/min, preferably 5 to 7l/min, preferably 4 to 6l/min.

In a preferred embodiment, the static mixer is operated with a speed of 0.3 to 2.5 m/s, preferably 0.5 to 2 m/s, preferably 0.5 to 1.5 m/s.

In a preferred embodiment of the present invention the lipid phase is mixed with the aqueous phase in step c) of the present process, preferably in a circular cylindrical static mixer with a diameter of 2 to 10, preferably 3 to 7, preferably 4 mm with a flow rate from 1.5l/min to 8l/min, preferably 2,0l/min to 7l/min, most preferably 5l/min to 7l/min or 4 to 6l/min.

Preferably, the static mixer employing said flow rate has a housing with a diameter of 2 to 10, preferably 3 to 7, preferably 4 mm and a length from 80 to 150, preferably 90 to 110, in particular 100 mm In a preferred embodiment, the speed of the composition flow in the static mixer is from 5 to 40 m/s, preferably 10 to 30 m/s, preferably 10 to 20 m/s.

In a preferred embodiment of the present invention, the pressure applied at the inlet of the static mixer is from 2 to 30 bar, preferably 2 to 20 bar, preferably 2 to 15 bar, preferably 2 to 12 bar, preferably 2 to 10 bar, preferably 2 to 8 bar.

Thus, most preferred, the pressure drop equals the pressure applied at the inlet of the static mixer so that there is no pressure at the outlet of the static mixer. However, in another embodiment, the pressure applied at the inlet of the static mixer is greater than the pressure drop, so that there is a pressure of for example 5 bar, preferably 3 bar at the outlet of the static mixer.

The static mixer used in the present invention preferably has a cylindrical, for instance tubular, in particular pipe-like or tube-like, housing or a squared housing. Preferably, the housing is tubular, that means in form of a circular cylinder. The housing, preferably the tubular housing, has preferably a diameter of 3 to 10, preferably 3 to 8, preferably 4 mm The housing comprises at least one inlet, preferably one or two inlets, for delivery of the incoming feed fluids. Within said housing at least one mixer element, preferably at least four mixer elements, for instance a baffle or a series of baffles, is positioned.

Preferably, the static mixer has at least 4, preferably at least 5, preferably at least 6 mixer elements. Most preferred, the static mixer has between 6 and 20, preferably 7 to 18, most preferred 8 to 16 mixer elements.

In a preferred embodiment of the present invention, the at least one mixer element has a length of 3 to 5 mm, in particular 4 mm Preferably, the housing of the static mixer has a length of 80 to 150, preferably 90 to 110 and preferably 100 mm In a preferred embodiment of the present invention, the housing, in particular the tubular housing has a diameter of 3 to 10, preferably 3 to 8, preferably 4 mm and a length of 80 to 150, preferably 90 to 110 and preferably 100 mm In a preferred embodiment of the present invention, the static mixer does not comprise any moving element, in particular no rotor and no rotating element.

In a preferred embodiment of the present invention, the at least one mixer element is of helical shape. Thus, such a static mixer is a helical static mixer. In a further preferred embodiment, the at least one mixer element is of plate-like shape. Thus, such a static mixer is a plate-type static mixer. Preferably, the at least one mixer element is able to produce simultaneously patterns of flow division and radial mixing.

Thus, to facilitate mixing according to the present invention, a static mixer is used. The static mixer disperses one liquid phase, i. e. the liquid lipid phase of the present invention, into a main continuous phase, i. e. the aqueous phase of the present invention, with which it would normally be immiscible in order to prepare a oil-in-water emulsion. Thus, for the mixing step of the present process preferably a static mixer is used to create an emulsion, preferably a stable emulsion, comprising lipid globules. Preferably, the lipid phase is emulsified in the aqueous phase under such conditions that large lipid globules are created.

Preferably, the lipid phase is added or injected into the aqueous phase shortly before entering the static mixer. Preferably already from this point onwards and including it, high shear forces are to be avoided in the process according to the present invention.

In the present process it is preferred to avoid high shear forces. Thus, it is preferred to use lower shear force relative to standard homogenisation during the complete process, preferably at least from the fat injection point onwards and including it, that means during and after the step of feeding the liquid lipid phase into the aqueous phase, e. g. prior to or during mixing step c).

In general, homogenisation is used to emulsify the lipid phase in the aqueous phase to reduce creaming and oxidation of the fatty acids. In standard infant formulae rather small globules are produced leading to a very stable emulsion. Since the present process aims to produce larger lipid globules this might result in a less stable emulsion and faster oxidation of fatty acids. Instead, it was found that with the composition produced by the present process excessive creaming did not occur within 24 h and when fatty acid oxidation was measured after 18 months of storage it was found to be acceptable. Surprisingly, it was even very similar to that observed with standard infant formula, despite an increased amount of free fat. The presence of a little bit of creaming was even found to be advantageous since it mimics the situation during breast feeding.

In a particularly preferred embodiment of the present process the lipid and protein component-containing composition obtained in step c) is then reheated to 75 to 85° C., preferably 78 to 80° C. to further reduce, preferably completely eliminate pathogenic bacteria. Advantageously, reheating at this stage also leads to a reduction of viscosity. Preferably, the lipid globules, also called lipid droplets, of the composition produced with the process according to the present invention have a volume-weighted mode diameter of at least 1 µm, and/or are lipid globules wherein at least 60% of said lipid globules have a diameter from 2 to 12 µm (% based on vol.-%). Preferably, the lipid globules, also called lipid droplets, of the composition produced with the process according to the present invention have a volume-weighted mode diameter of at least 1 µm, preferably of at least 2 µm, more preferably of at least 3 µm, most preferred of at least 3.5 µm, even more preferably about 4 µm. Preferably the volume-weighted mode diameter should be below 20 µm, preferably below 15 µm, more preferably below 10 µm, more preferably below 8 µm. In particular, the lipid globules of the composition produced with the process according to the present invention have a volume-weighted mode diameter from 1 to 20 µm, preferably 1 to 15 µm, preferably 2 to 12 µm, preferably 7 to 12 µm, preferably 1 to 10 µm, preferably from 2 to 8 µm, more preferably from 3 to 8 µm, most preferred from 4 to 8 µm, in particular 4 to 8 µm and preferably 4 to 5 µm. The term "volume-weighted mode diameter" (or mode diameter based on volume) relates to the diameter which is the most present based on volume of total lipid, or the peak value in a graphic representation, having on the x-axis the diameter and on the y-axis the volume in %.

Preferably, the lipid globules, also called lipid droplets, of the spray-dried composition produced with a process according to the present invention are lipid globules, wherein at least 60%, preferably at least 65%, preferably at least 70% (each % based on volume of the lipid globules) have a diameter from 2 to 12 µm, preferably 3 to 11, preferably 3 to 5 µm.

Advantageously, the lipid and protein component-containing composition comprising large lipid globules, obtained in step c) of the present process has a lower apparent dynamic viscosity between 30 and 80 cP due to the higher temperature achieved by reheating. Compared to conventional processes a lowering of the viscosity of about 5 cP occurs. Advantageously, this reduction of viscosity leads in turn to an increased capacity during an optional spray-drying step.

In a particularly preferred embodiment of the present invention the lipid and protein component-containing composition obtained after step c) of the present process is used as an infant formula, preferably a ready-to-feed liquid infant formula, a follow-on formula or growing up milk. A growing up milk is sometimes also referred to as milk-based drink for young children, and is intended for children of 1 to 6 years of age, more preferably young children of 1 to 3 years of age.

In a further particularly preferred embodiment the lipid and protein component-containing composition obtained in step c) of the present process is spray-dried with an atomization system, preferably a low shear atomization system, preferably employing a two-fluid nozzle or a rotary atomizer, so as to obtain a spray-dried lipid and protein component-containing composition comprising lipid globules.

In a particularly preferred embodiment the total solid content of the lipid and protein component-containing composition, in particular mixture, to be atomized has a dry matter content of 30 to 65 wt. %, preferably 40 to 60 wt. %, more preferably 50 to 60 wt. %.

The lipid and protein component-containing composition obtained after step c) of the process according to the present invention comprises large lipid globules and advantageously and preferably has a lower apparent dynamic viscosity which preferably in an optional subsequent spray-drying step enables a higher total solid content which is economically highly beneficial.

In the context of the present invention the term "spray-drying" refers to a process of transforming a feed from a fluid state into a dried particulated form, in particular by spraying the feed into a hot drying medium. Preferably, spray-drying involves a step of atomization of the liquid feed into fine droplets, of mixing these droplets with a heated gas stream allowing the liquid to evaporate and leave dried solids and optionally separating the dried product from the gas stream to be collected.

Preferably, the liquid feed may be a solution, slurry, emulsion, gel or paste and must be capable of being atomized The process preferably involves bringing together a highly dispersed liquid and a sufficient volume of hot gas, in particular air, to produce evaporation and drying of the liquid droplets obtained by the atomization. Preferably, the air supplies heat for evaporation and conveys the dried product to a collector.

In the context of the present invention, an atomizer is an equipment, which breaks bulk liquid into small droplets forming a spray.

In the context of the present invention, a rotary atomizer, also called a wheel or a disc atomizer, is an atomizer, which uses energy of a high-speed rotating wheel to divide bulk liquid into droplets. Preferably, the feed is introduced at the center of the wheel, flows over the surface to the periphery and disintegrates into droplets when it leaves the wheel.

Once the liquid is atomized it is brought into intimate contact with the heated gas for evaporation to take place equally from the surface of all droplets within the drying chamber. The heated gas is preferably introduced into the chamber by an air disperser, which ensures that the gas flows equally to all parts of the chamber.

The atomization system, preferably the low shear atomization system, of the present invention, hereinafter also called spray dryer, employs a rotary atomizer, also called wheel atomizer, or a two-fluid nozzle which both preferably exert low shear forces onto the lipid and protein component-containing composition to be spray-dried.

Concomitantly, when applying spray-drying in the process according to the present invention a higher smouldering temperature, in particular a smouldering temperature of from 190° C. to 210° C., preferably of from 195° C. to 200° C., can be achieved during spray-drying which preferably and beneficially allows the use of higher temperatures during spray-drying leading to an increased capacity of the spray dryer. In prior art processes smouldering temperatures of around 185° C. are typically achieved.

Thus, preferably and advantageously, with the lipid and protein component-containing composition obtained in the present process step c) the smouldering temperature is higher, enabling a higher temperature during spray-drying, which is economically an advantage. Without wishing to be bound by theory, the higher smouldering temperature might be due to the reduced surface area of the large lipid globules.

In the context of the present invention the term "smouldering temperature" means the temperature at which the product starts an exothermic reaction, that means when a certain amount of energy is reached. This normally occurs in lumps of the product which insulate the core of the lump and allow for a temperature increase. This needs a certain initial temperature and a certain time to start. When the reaction starts the powder product starts to self ignite and the higher the temperature the faster the reaction progresses. Thus, from a safety point of view there is a maximum temperature at which a powder can be dried. Drying at a higher temperature bears the risk of the formation of an ignition source which might lead to an explosion in the drier. Thus, the smouldering temperature means auto ignition temperature which is different for a specific powder and depends on a number of variables. The present process advantageously allows for a higher smouldering temperature, that means the temperature at which the risk of self ignition of the powder exists is higher than in known processes.

Preferably, the spray-drying step using an atomization system, preferably a low shear atomization system, uses a pump, preferably a low pressure pump, to control the feed of the composition obtained in step c) to the spray dryer. Preferably, said pump uses at most the shear forces applied by the static mixer of step c). Thus, it is preferred that the shear forces exerted on the lipid globules in the subsequent spray-drying step, in particular the feeding, in particular pumping, step do not exceed the shear forces experienced during mixing. Preferably, a positive displacement pump is used to control the feed of the mixture to the spray dryer. A positive displacement pump causes a fluid to move by trapping a fixed amount of the fluid and then displacing the trapped volume of fluid into the discharge pipe.

If a two-fluid nozzle, hereinafter also called two-fluid lance is used for spray-drying the pressure is preferably as low as possible without fouling the spray dryer, which would lead to unnecessary cleaning. Preferably, the two-fluid nozzle is used with a pressure of at most 10 bar, preferably at most 8 bar, more preferably 1.5 to 5 bar, most preferably 2.5 to 4 bar.

Preferably, the present invention relates to a process as identified above, wherein the pressures of both air and liquid used for spray-drying are at most 10 bar, preferably at most 8 bar, more preferably 1.5 to 5 bar, more preferably 2.5 to 4 bar, preferably if a two-fluid nozzle is used.

Two fluid nozzles (2F nozzle) are commercially available. The nozzles can be equipped with an external mixing cap or with an internal mixing cap. Internal 2F nozzles have the advantage to have slightly lower energy requirements. Internal and external 2F nozzles yield different spray angles and it will depend on the design of the used dryer which type of 2F nozzle is preferred. This is easily deducible to a person skilled in the art.

The pressure used for the two-fluid nozzle might differ according to which specific model is used but can be determined accordingly by a skilled person under the condition that the lipid globules produced in the mixing step are not subjected to higher shear forces than those experienced during mixing.

In a preferred embodiment, both process step c), that means mixing of the lipid and aqueous phase, and the spray-drying are conducted under conditions exerting low forces, preferably shear forces, onto the composition processed.

The preferred two-fluid nozzles have preferably a particularly high spraying capacity, which is advantageous for an economical production. Further, the preferred use of a two-fluid nozzle allows for much lower pressures to be applied during spray-drying, which preferably results in a reduction of shear forces exerted onto the lipid globules. In spray-drying processes known in the art pressures as high as 200-300 bar are used. In a preferred embodiment of the present process, the pressure used for spray-drying is at most 10 bar, preferably below 10 bar, preferably at most 9 bar, preferably below 9 bar, more preferably at most 8 bar, preferably below 8 bar, preferably at most 5 bar, preferably below 5 bar, preferably at most 4 bar, preferably below 4 bar, preferably at most 3.5 bar, preferably below 3.5 bar, preferably from 1.5 to 5 bar, most preferred from 2.5 to 4 bar, preferably from 2.7 to 3.5 bar, in particular 3 bar.

In a preferred embodiment of the present invention, a rotary atomizer is used for spray-drying. Preferably, the rotary atomizer is configured and operated in such a way so as to achieve the desired particle size distribution of the obtained composition.

In the context of the present invention, the configuration of said rotary atomizer is preferably determined by the wheel diameter.

In the context of the present invention, the operating conditions used with the present rotary atomizer are preferably the tip speed of the wheel, the rotational speed of the wheel and the inlet temperature of the air introduced into the spray dryer.

In particular the present invention employs a rotary atomizer having a wheel diameter of 100 to 250 mm, preferably of 100 to 150 mm, more preferably of 120 mm In a furthermore preferred embodiment of the present invention the rotary atomizer is operated with a tip speed of the wheel from 50 to 120 m/s, preferably from 60 to 100 m/s, more preferably from 65 to 95 m/s, most preferred from 70 to 90 m/s.

In a preferred embodiment of present invention, the rotational speed employed in the rotary atomizer, hereinafter also termed wheel speed, is from 10000 to 15000 rpm (rotations per min), preferably 11000 to 14000, preferably 11000 or 14000 rpm.

The above mentioned parameters of wheel diameter, tip speed and wheel speed of the rotary atomizer are interlinked, which means that if one is changed, the other two will change as well. In the context of the present invention, tip speed is the parameter most preferred.

In a furthermore preferred embodiment of the present invention the inlet temperature employed in the atomization system, that means the spray dryer, is from 160 to 210° C., preferably from 170 to 200° C., preferably 175 to 195° C., preferably 175° C. or 193° C.

In a preferred embodiment of the present invention, the atomization system, in particular the rotary atomizer, is employed with a tip speed of 65 to 95 m/s, preferably 70 to 90 m/s and an inlet temperature of the spray dryer of 160 to 210° C. In a furthermore preferred embodiment of the present invention, the atomization system is employed with a tip speed of 65 to 95 m/s, preferably 70 to 90 m/s and an inlet temperature of the spray dryer of 193° C. In a furthermore preferred embodiment of the present invention, the atomization system is employed with a tip speed of 65 to 95 m/s, preferably 70 to 90 m/s and an inlet temperature of the spray dryer of 175° C.

The gas used for spraying with the two-fluid nozzle is preferably compressed air. Preferably, the gas used for drying is preferably filtered atmospheric air. The gas/liquid flow ratio's (kg/kg) is preferably between 1:1 and 1:4, preferably 1:1 to 1:3, in particular 1:2.

Furthermore preferred, the drying gas has an inlet temperature of at least 150° C., preferably at least 160° C., preferably at least 170° C., preferably at least 175° C., preferably at least 180° C., preferably at least 190° C., more preferably 193° C. or 195° C.

Preferably, the spray-dried lipid and protein component-containing composition is obtained subsequent to spray-drying according to the present invention as a spray-dried powder which preferably can then be filled in appropriate containers. Thus, the present composition is in one embodiment in solid form, preferably spray-dried form, preferably powdered form.

In a particularly preferred embodiment further components which are already present in dry form, such as some minerals, vitamins, and non-digestible oligosaccharides are dry blended into the spray-dried lipid and protein component-containing composition before it is filled into containers.

However, the present spray-dried composition may also be in liquid form, preferably after reconstitution of the obtained spray-dried form in an aqueous medium.

Advantageously, the larger lipid globules, which preferably are coated by a membrane of polar lipids and thus more resemble the diameter and composition of natural human milk lipid globules are also preserved after the optional spray-drying, in particular after subsequent reconstitution in an aqueous medium. Thus, upon reconstitution with water the spray-dried composition prepared by the present process still displays these features.

In case ingredients specified herein to be added either to the aqueous or the lipid phase are sensitive to the temperature(s) or conditions employed during any of the steps of the process according to the present invention they might also be added at a later point in the process, such as after mixing and before the optional spray-drying or even after spray-drying.

The present invention also relates to a lipid and protein component-containing composition, which is liquid, comprising lipid globules with a volume-weighted mode diameter of at least 1 µm and/or are lipid globules, wherein at least 60%, preferably at least 65%, preferably at least 70%, of said lipid globules have a diameter from 2 to 12 µm, preferably 3 to 11 µm, preferably 3 to 5 µm, (% based on vol.-%). Furthermore, the obtained lipid globules have a volume-weighted mode diameter of at least 1 µm, preferably at least 2 µm, more preferably at least 3 µm, even more preferred at least 3.5 µm, most preferably about 4 µm, obtainable, preferably prepared, according to the process of the present invention. Preferably, the volume-weighted mode diameter should be below 20 µm, preferably below 15 µm, preferably below 10 µm, more preferably below 8 µm. In particular, the lipid globules of the composition produced with the process according to the present invention have a volume-weighted mode diameter from 1 to 20 µm, preferably 1 to 15 µm, preferably 2 to 12 µm, preferably 7 to 12 µm, preferably 1 to 10 µm, preferably from 2 to 8 µm, more preferably from 3 to 8 µm, most preferred from 4 to 8 µm, in particular 4 to 8 µm and preferably 4 to 5 µm.

The present invention also relates to a, preferably spray-dried, lipid and protein component-containing composition comprising lipid globules, wherein at least 60%, preferably at least 65%, preferably at least 70% (each % based on volume of the lipid globules) have a diameter from 2 to 12, preferably 3 to 11, preferably 3 to 5 µm.

Preferably, the lipid globules, also called lipid droplets, of the composition, preferably of the spray-dried composition, produced with a process according to the present invention are lipid globules, wherein at least 60%, preferably at least 65%, preferably at least 70% (each based on volume of the lipid globules) have a diameter from 2 to 12 µm, preferably 3 to 11, preferably 3 to 5 µm.

The present invention also relates to a spray-dried lipid and protein component-containing composition comprising lipid globules with a volume-weighted mode diameter of at least 1 µm and/or lipid globules wherein at least 60% of said lipid globules have a diameter from 2 to 12 µm (% based on vol.-%). The present invention also relates to a spray-dried lipid and protein component-containing composition comprising lipid globules with a volume-weighted mode diameter of at least 1 µm, preferably at least 2 µm, more preferably at least 3 µm, even more preferably at least 3.5 µm, most preferred about 4 µm, obtainable, preferably prepared, according to the process of the present invention. Preferably, the volume-weighted mode diameter should be below 20 µm, preferably below 15 µm, preferably below 10 µm, more preferably below 8 µm. In particular, the spray-dried lipid globules of the composition produced with the process according to the present invention have a volume-weighted mode diameter from 1 to 20 µm, preferably from 1 to 15 µm, 2 to 12 µm, preferably 7 to 12 µm, preferably 1 to 10 µm, preferably from 2 to 8 µm, more preferably from 3 to 8 µm, most preferred from 4 to 8 µm, preferably 4 to 5 µm. The compositions obtained according to the present processes exhibit improved powder properties and an improved homogeneity. Further, the fat content and the particle size distribution of the present compositions is well controllable. It was found that the powdered composition obtained by the present process had good shelf-life stability. The powder had an excellent wettability and dissolvability properties upon reconstitution with water, which was improved when compared with powder of standard formula with smaller lipid globules.

Preferably, the lipid and protein component-containing composition obtained after mixing or the spray-dried lipid and protein component-containing composition obtained after optional spray-drying prepared by the process according to the present invention is a nutritional or pharmaceutical composition, preferably an infant formula or a follow-on formula or a growing up milk. Thus, preferably, the compositions are liquid or a powder suitable for making a liquid composition after reconstitution with an aqueous solution, preferably water. Advantageously, the size of the lipid globules and the coating with polar lipids, if present, remain the same after the optional spray-drying and subsequent reconstitution. Preferably, the spray-dried composition of the present invention is reconstituted, preferably with water, just prior to consumption. This will ensure stability of the emulsion, although a little bit of creaming can occur due to the large lipid globules of the present composition. A small amount of creaming is beneficial since this also closely resembles the conditions of breast feeding.

Thus, the lipid and protein component-containing composition or the spray-dried lipid and protein component-containing composition according to the present invention are preferably administered to a human subject with an age of at most 36 months, preferably of at most 18 months, more preferably of at most 12 months, even more preferably of at most 6 months. In particular, the compositions obtained by the present process are suitable and prepared for providing the daily nutritional requirements to a human subject with an age of at most 36 months, in particular an infant with an age of at most 24 months, even more preferably an infant with an age of at most 18 months, most preferably with an age of at most 12 months. Hence, the lipid and protein component-containing composition or the spray-dried lipid and protein component-containing composition are used for feeding a human subject. Advantageously, it was found that the administration of a composition containing large lipid globules, preferably coated with polar lipids, prevents or reduces the risk of obesity and improves body composition, i. e. increases lean body mass and decreases fat mass, later in life.

After the optional spray-drying, the composition of the present invention is suitably in a powdered form, which can preferably be reconstituted with water to form a liquid. In a preferred embodiment it is foreseen, to add an aqueous medium, preferably water, to the spray-dried composition obtained so as to obtain a liquid or semi-liquid reconstituted spray-dried composition of the present invention. Thus, the present invention also relates to a liquid or semi-liquid reconstituted composition comprising the spray-dried composition obtained after spray-drying according to the present process in an aqueous medium.

When the spray-dried composition is in a liquid form, the preferred volume administered on a daily basis is in the range of about 80 to 2500 ml, more preferably about 450 to 1000 ml per day. These amounts are also preferred for the liquid lipid and protein component-containing composition.

In a further preferred embodiment of the present invention, the present solid spray-dried composition or the liquid reconstituted spray-dried composition as well as the liquid lipid and protein component-containing composition may be supplemented with at least one further substance, in particular a pharmaceutically or nutritionally effective substance so as to obtain a pharmaceutical or nutritional composition comprising the present spray-dried, reconstituted or liquid composition.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

Further preferred embodiments of the present invention are subject of the subclaims.

The invention is further described by way of the following example and the accompanying figures.

EXAMPLE

An infant formula was prepared being a powder comprising per kg final product about 4800 kcal, about 247 g lipid, about 540 g digestible carbohydrates, about 41 g non-digestible oligosaccharides and about 97 g protein. The composition was prepared using butter milk serum powder enriched in milk phospholipids, a vegetable oil blend (fat), demineralised whey powder (protein), lactose, and non-digestible oligosaccharides. Also vitamins, minerals, trace elements as known in the art were used.

The amount of butter milk serum powder was such that 1.62 wt. % phospholipids based on total lipids were present in the final composition.

An aqueous phase, comprising the butter milk powder, protein and digestible carbohydrates and the other ingredients, except the fat and fat soluble vitamins, was prepared as known in the art. The dry matter content of the aqueous phase was between 30 to 48 wt. %. The mixture was heated to 50° C.

Figure 1:
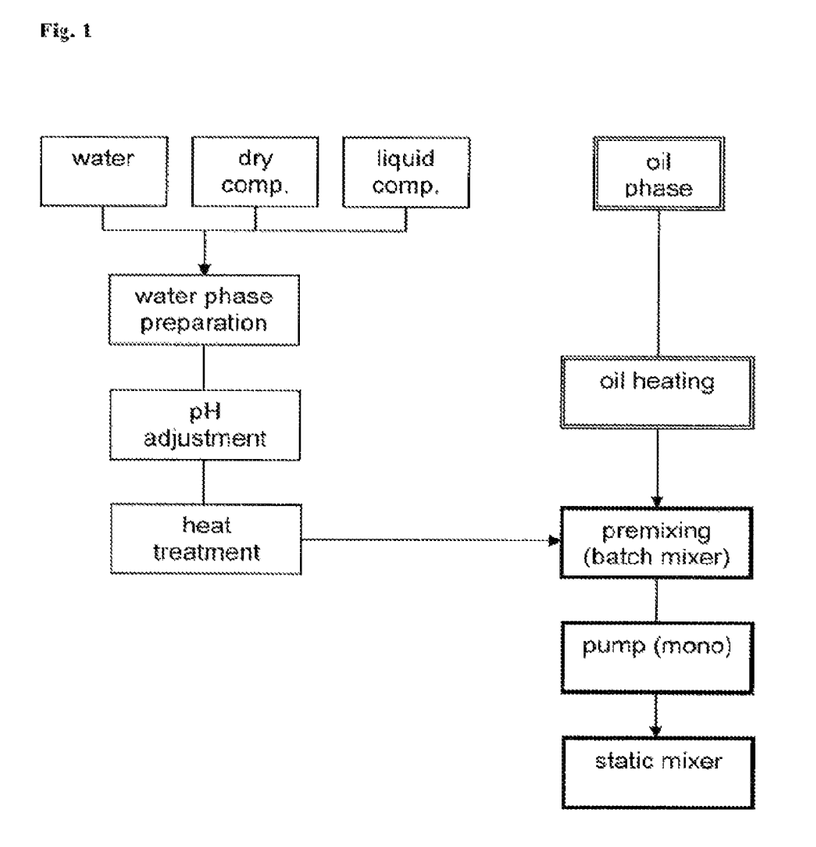
FIG. 1 shows a flow scheme of the present process, also described in the example, wherein comp. is short for components and panels with solid lines represent the aqueous phase, panels with double lines represent the lipid phase and panels with bold lines represent the mixture, i. e. the emulsion of both phases.

A fat phase was prepared as known in the art. The vegetable oil blend was also heated to 50° C. and added to the water phase in a w/w ratio of between 15 to 30 and premixed by stirring with a Typhoon propeller mixer (see FIG. 1). The total solid content of the fat and aqueous phase mixture was between 40 and 60 wt %.

The pre-emulsion obtained after the premixing step comprises after premixing for ten minutes lipid globules with a mode diameter based on volume of 15.97 μm and after premixing for one hour the lipid globules with a mode diameter based on volume of 15.82 μm.

The pre-emulsion was fed into a static mixer (Primix, PMS4-6-316L-SAN) having a tube-like housing with a length of 100 mm The static mixer housing had a length of 100 mm and a diameter of 4 mm The aqueous and fat phase were thoroughly mixed by pumping the preblended mixture through the static mixer with different flows in order to emulsify the lipid phase into the aqueous phase.

The table below indicates the pressure applied at the inlet of the housing and the pressure drop achieved while flowing through the static mixer and being determined by measuring and subtracting the pressure at the outlet.

From the table it is evident that the finally obtained emulsion leaves the static mixer without any pressure.

In the table the used flow through the static mixer is also shown.

TABLE

| Mixer type (diameter) | Flow | Pressure at inlet (bar) | Pressure drop between inlet and outlet (bar) | Mode diameter based on volume |
|---|---|---|---|---|
| 4 mm | 5.7 l/min | 5.0 | 5.0 | 7.1 μm |
| 4 mm | 2.0 l/min | 2.3 | 2.3 | 12.0 μm |
| 4 mm | 3.0 l/min | 4.5 | 4.5 | 10.0 μm |

The size of the lipid globules in the final emulsion was measured with a Mastersizer 2000 (Malvern Instruments, Malvern UK). The volumetric mode diameter depends on flow through the static mixer.

Figure 3:
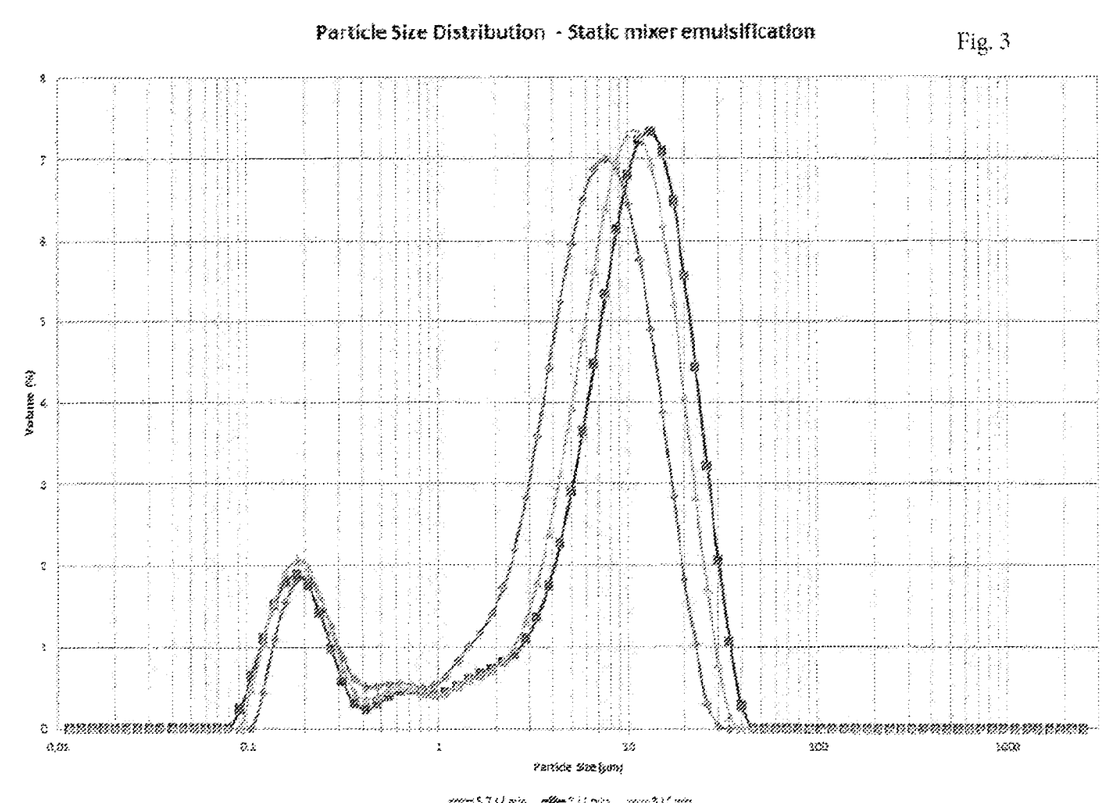
FIG. 3 shows the particle size distribution of various infant formulas of the present invention.

FIG. 3 shows the particle size distribution of various samples of an infant formula obtained during production employing the present process. During the production process 3 different samples were taken for size distribution analysis.

It is shown that the lipid globules have a volume based mode diameter of ranging from 7 to 12 μm, dependent on the flow, and have a relatively narrow size distribution.

Without being bound by theory, it appears as if the high pressure drop achieved results in the particularly preferred size of the lipid globules.

The higher the flow rate is the smaller the lipid globules become. Thus, specifically controlling and adapting the pressure used for the static mixer enables a controlled and particle size orientated provision of lipid globules of the desired size.

Figure 2:
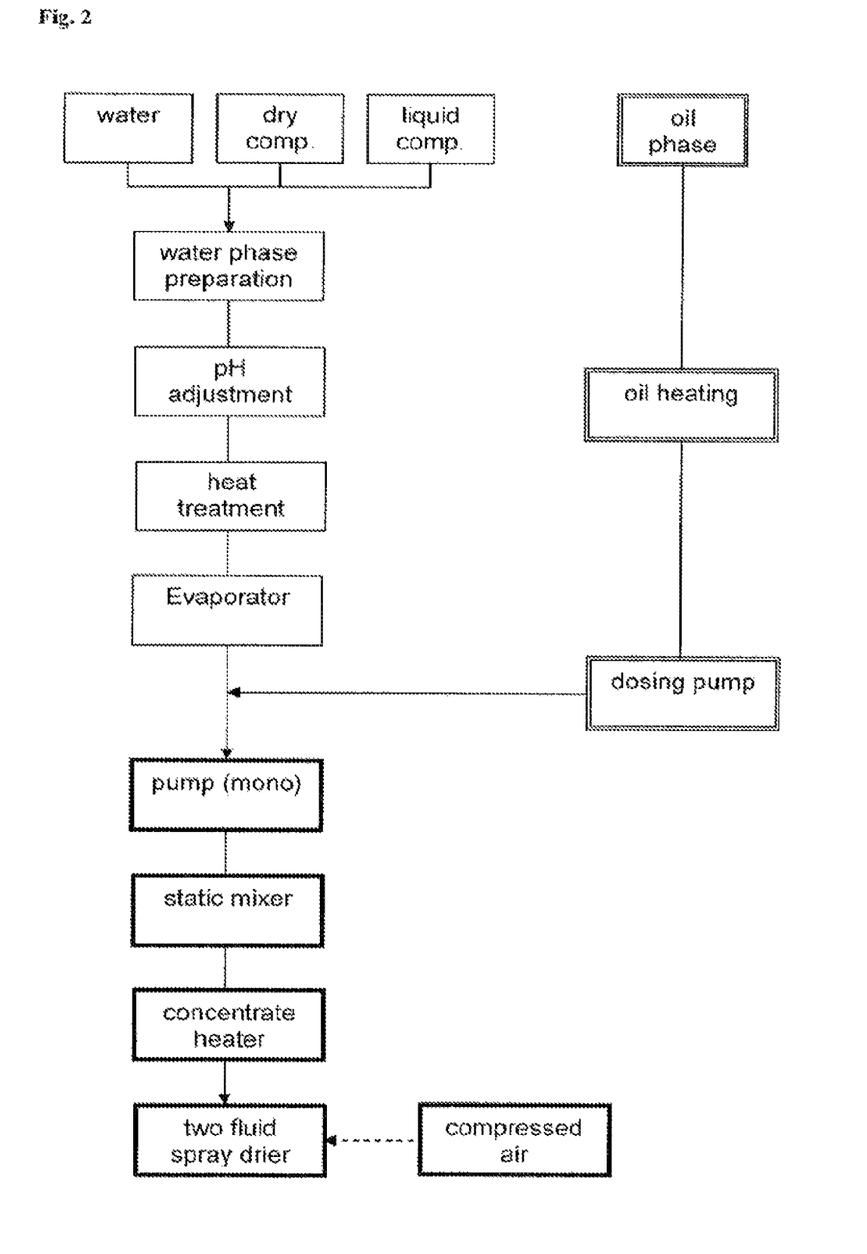
FIG. 2 shows a flow scheme of another embodiment of the present process using the same depiction as described for FIG. 1 above.

In this example, the lipid globules obtained after mixing in step c) were not spray-dried. However, as evident from FIG. 2, the process of the present example can be further extended to subject the obtained emulsion to a spray-drying step.

What is claimed is:

1. A process for preparing a lipid and protein component-containing composition selected from a group consisting of an infant, a follow-on formula, and a growing up milk, the composition including lipid globules, the process comprising:
    a) providing an aqueous phase with a dry matter content of 10 to 60 wt. % (based on total weight of the aqueous phase), which includes at least one protein component;
    b) providing a liquid lipid phase, which includes at least one lipid; and
    c) mixing the lipid phase with the aqueous phase in ratio of 5 to 50% (w/w) at a pressure of no greater than 10 bar using a static mixer so as to obtain a lipid and protein component-containing composition with lipid globules, wherein the lipid globules have a volume-weighted mode diameter of less than 15 μm,
    wherein the process does not include the use of a dynamic high pressure homogeniser or a dynamic high pressure homogenization step, wherein the static mixer used in step c) is configured and operates so as to achieve a pressure drop of 2 to 30 bar between inlet and outlet of the static mixer.

2. A process preparing lipid and protein component-containing composition selected from a group consisting of an infant, a follow-on formula, and a growing up milk, the composition including lipid globules, the process comprising:
    a) providing an aqueous phase with a dry matter content of 30 to 50 wt. % (based on total weight of the aqueous phase), which includes at least one protein component;
    b) providing a liquid lipid phase, which includes at least one lipid; and
    c) mixing the lipid phase with the aqueous phase in ratio of 5 to 50% (w/w) at a pressure of no greater than 10 bar using a static mixer so as to obtain a lipid and protein component-containing composition with lipid globules, wherein the lipid globules have a volume-weighted mode diameter of less than 15 μm,
    wherein the process does not include the use of a dynamic high pressure homogeniser or a dynamic high pressure homogenization step.

3. The process according to claim 2, wherein the liquid lipid phase provided in step b) is premixed with the aqueous phase provided in step a) prior to mixing step c).

4. The process according to claim 2, wherein the static mixer exerts a low shear force during mixing.

5. The process according to claim 2, wherein the lipid globules have a volume-weighted mode diameter of at least 1.0 μm and/or wherein at least 60% of said lipid globules have a diameter from 2 to 12 μm (% based on vol.-%).

6. The process according to claim 2, wherein the protein component is selected from a group consisting of skim milk, whey, whey protein, whey protein isolate, whey protein hydrolysate, casein, casein hydrolysate and soy protein.

7. The process according to claim 2, wherein the aqueous phase includes at least one further component selected from a group consisting of digestible carbohydrates, lactose, non-digestible carbohydrates, vitamins and minerals.

8. The process according to claim 2, wherein a housing of the static mixer used in step c) is of circular cylindrical shape and has a length of 80 to 150 mm and a diameter of 2 to 10 mm.

9. The process according to claim 2, wherein the static mixer used in step c) is operated with a flow rate of 1.5 to 8l/min.

10. The process according to claim 2, wherein subsequent to step a) and prior to step c) the aqueous phase is sterilised or pasteurised.

11. The process according to claim 2, wherein the lipid and protein component-containing composition obtained in step c) is reheated to 75 to 85° C.

12. The process according to claim 2, wherein at least one of the aqueous and the lipid phase includes polar lipids, in particular phospholipids in an amount of 0.5 to 20 wt. % (based on total lipid of the composition).

13. The process according to claim 2, further comprising spray-drying the lipid and protein component-containing composition obtained in step c) with an atomization system employing a two-fluid nozzle or a rotary atomizer so as to obtain a spray-dried lipid and protein component-containing composition having the lipid globules.

14. The process according to claim 13, wherein a pressure used for spray-drying is at most 10 bar, if a two-fluid nozzle is used.

15. The process according to claim 13, wherein an inlet temperature for a drying gas used for spray-drying is at least 150° C.

16. The process according to claim 2, wherein the mixing is performed at a temperature of from 40° C. to 90° C.

17. The process according to claim 2, wherein the mixing is performed at a temperature of from 50° C. to 80° C.

18. A process for preparing a lipid and protein component-containing composition, the process comprising:
    a) providing an aqueous phase comprising a protein component and a dry matter content of 10 to 60 wt. % (based on total weight of the aqueous phase);
    b) providing a liquid lipid phase comprising a lipid; and
    c) flowing the lipid phase and the aqueous phase in a lipid phase to aqueous phase ratio of 5 to 50% (w/w) into a static mixer with an inlet pressure of no greater than 10 bar and an outlet pressure that is 0.5 to 5 bar less than the inlet pressure to obtain the lipid and protein component-containing composition,
    wherein the lipid and protein component composition comprises lipid globules having a volume-weighted mode diameter of less than 15 μm and is selected from the group consisting of an infant formula, a follow-on formula, and a growing up milk, and
    wherein the process does not include the use of a dynamic high pressure homogeniser or a dynamic high pressure homogenization step.

19. The process according to claim 18, wherein flowing the lipid phase and the aqueous phase in a lipid phase to aqueous phase ratio of 5 to 50% (w/w) into a static mixer occurs with a flow rate of 1.5 to 8l/min, and wherein at least one of the lipid phase or the aqueous phase is heated to a temperature of from 50° C. to 80° C. during the flowing.

* * * * *